United States Patent [19]

Nimmrichter

[11] 4,159,759
[45] Jul. 3, 1979

[54] DEVICE FOR TOPPLING ARTICLES DURING CONVEYANCE

[75] Inventor: Odo Nimmrichter, Gailingen, Fed. Rep. of Germany

[73] Assignee: S I G Schweizerische Industrie-Gesellschaft, Rheinfall, Switzerland

[21] Appl. No.: 857,178

[22] Filed: Dec. 2, 1977

[30] Foreign Application Priority Data

Dec. 7, 1976 [CH] Switzerland ............... 15383/76

[51] Int. Cl.² .............................................. B65G 47/24
[52] U.S. Cl. ...................................... 198/407; 198/409
[58] Field of Search ............... 198/406, 407, 408, 409, 198/410, 411, 412, 413, 415, 416, 373

[56] References Cited

U.S. PATENT DOCUMENTS

| 1,917,986 | 7/1933 | Lagerholm | 198/409 X |
| 2,073,945 | 3/1937 | Risser | 198/407 |
| 3,073,429 | 1/1963 | Anderson et al. | 198/406 |
| 3,110,387 | 11/1963 | Meyer et al. | 198/407 |
| 3,516,532 | 6/1970 | Calistrat | 198/409 X |

FOREIGN PATENT DOCUMENTS

2504306  8/1976  Fed. Rep. of Germany ........... 198/407

Primary Examiner—Robert B. Reeves
Assistant Examiner—James L. Rowland
Attorney, Agent, or Firm—Spencer & Kaye

[57] ABSTRACT

In a device for toppling articles of at least approximately rectangular outline while conveying such articles, which device includes a discharge path provided with carrier elements for moving the articles after toppling in a discharge direction lying in the plane of their outlines, at least two input paths are provided above the discharge path for conveying such articles in an input direction transverse to the discharge direction, with the plane of the outline of each article perpendicular to the input direction and the larger outline dimension of each article vertical, and a plurality of lowering and toppling mechanisms are provided, each mechanism being associated with a respective input path and disposed for transferring articles from its associated input path to the discharge path while lowering and toppling the articles, each mechanism including a supporting element movable between a position for supporting articles received from the associated input path and a release position for permitting such articles to drop, a pickup element for supporting and lowering such articles when the supporting element is moved to its release position, and a toppling element movable from a starting position for toppling such articles onto the discharge path upon lowering of such articles by the pickup element, so that the smaller outline dimension of each such article is verticle on the discharge path.

4 Claims, 7 Drawing Figures

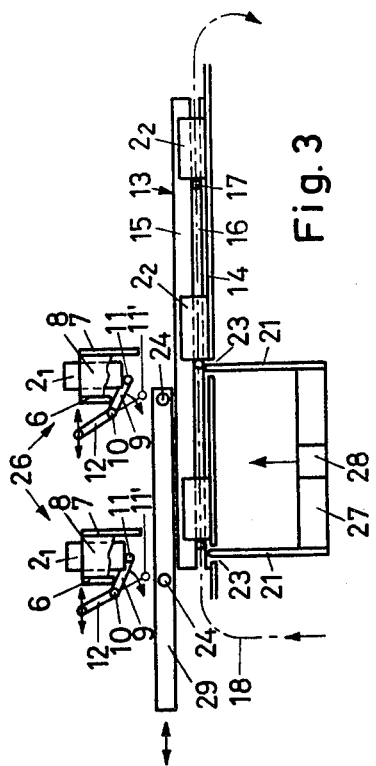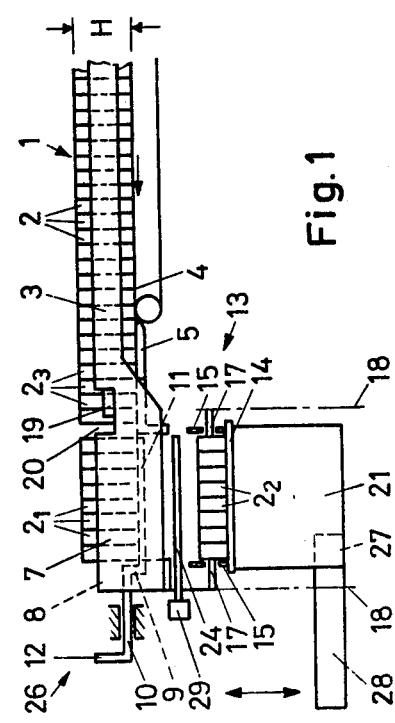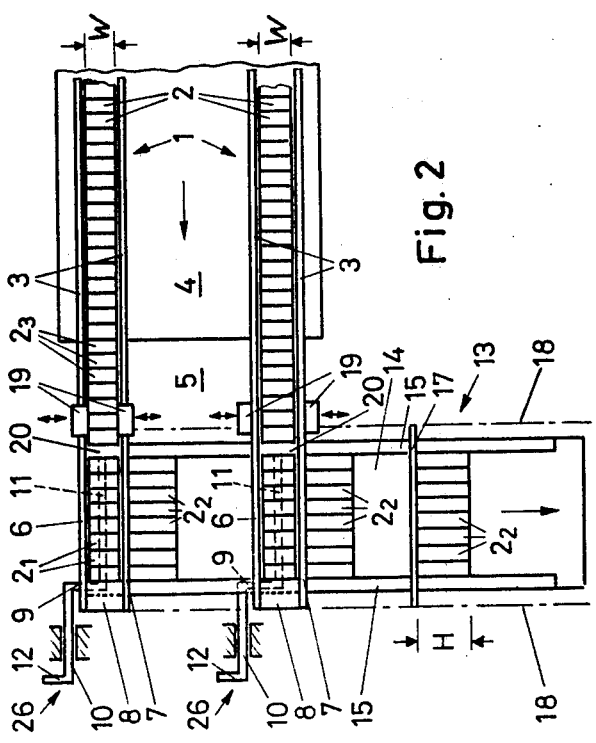

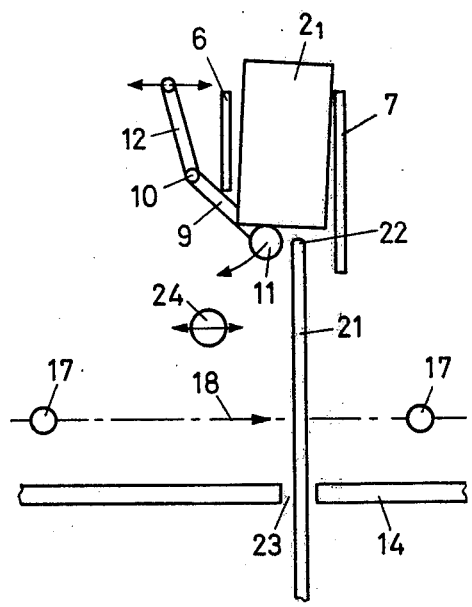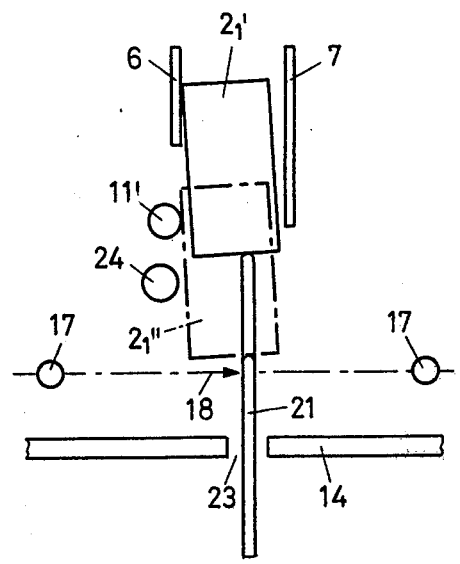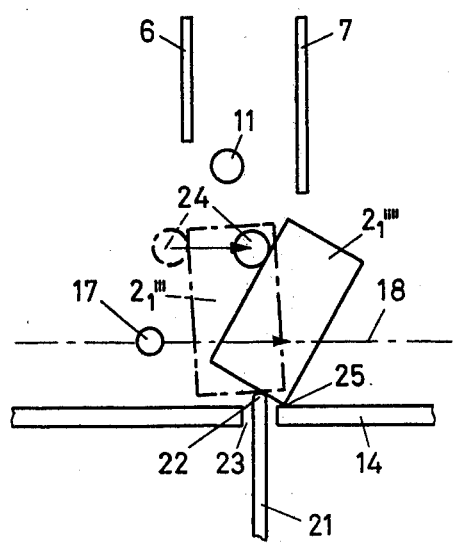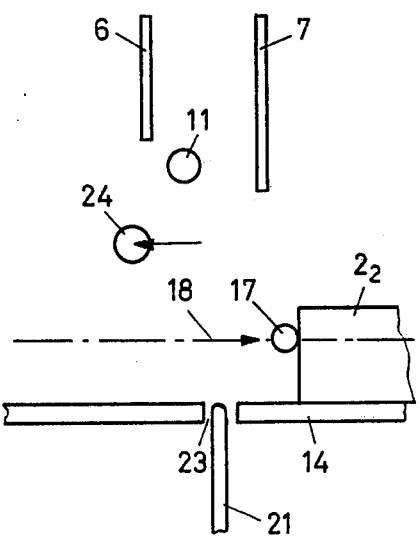

DEVICE FOR TOPPLING ARTICLES DURING CONVEYANCE

BACKGROUND OF THE INVENTION

The present invention relates to a toppling device for articles, particularly cookies or crackers, having an at least approximately rectangular outline, i.e. have two opposed long sides and two opposed short sides, the device having a discharge path along which the articles are conveyed by carrier elements in a direction in the plane of such outline.

In toppling apparatus disclosed in commonly owned U.S. Application Ser. No. 812,522, now U.S. Pat. No. 4,112,938, filed by Theo Walz and Fritz Glauser on July 5, 1977, as in earlier devices, such articles are introduced to the discharge path in an upright position and are conveyed by carrier elements, before and after toppling, in a direction which lies in the plane of their outline. There exists the danger in the operation of such earlier devices, under certain circumstances which will be described in detail below, that the articles will topple over at the wrong location along the discharge path, or will topple over backwards. In addition, the previously proposed devices suffer from the drawback that their output can be increased only by increasing the operating speed of the conveying apparatus. Thus in order to attain high output rates, it is necessary to effect rapid introduction of the articles onto the discharge path and a rapid toppling action which subject fragile articles, in particular fragile cookies, to high levels of stress which they are often unable to withstand.

SUMMARY OF THE INVENTION

It is an object of the present invention to avoid the above-mentioned drawbacks and to provide a tilting device which can operate at very high outputs without exceeding moderate toppling speeds.

This and other objects are achieved according to the invention by arranging the discharge path so that it extends transversely to at least two input paths along which the articles are conveyed in an upright orientation, i.e. with their long sides vertical, in a direction perpendicular to the plane of their outline and are brought toward lowering and toppling mechanisms which lower and topple the articles onto the discharge path, each one of these mechanisms being provided with a movable supporting element for the upright articles placed thereonto. Upon movement of this element the articles are lowered into a release position on a delivery element and are then flipped onto the discharge path by the toppling element.

BRIEF DESCRIPTION OF THE DRAWINGS

FIG. 1 is a front elevational view of one preferred embodiment of a toppling device according to the invention.

FIG. 2 is a top plan view of the device of FIG. 1.

FIG. 3 is a side elevational view of the device of FIG. 1.

FIGS. 4-7 are side elevational detail views, to an enlarged scale, showing various phases of the lowering and toppling movement of an article by a lowering and toppling mechanism of the device of FIGS. 1-3.

DESCRIPTION OF THE PREFERRED EMBODIMENTS

Referring first to FIGS. 1-3, the illustrated apparatus includes two parallel, horizontal input paths 1 for rectangular cookies 2. Each path 1 has stationary side walls 3 and the bottoms of both paths are primarily defined by a common, endless conveyor belt 4. The cookies 2 are in an upright position on conveyor belt 4, that is their long dimension, or height, H is vertically oriented and their narrow dimension, or width, W is horizontally oriented, and the cookies are conveyed in a direction perpendicular to the plane defined by dimensions H and W.

Cookies 2 coming from an oven are introduced into paths 1 in a known manner (not shown). At the outlet end of each path 1 there is a respective lowering and toppling mechanism 26 which is to topple the cookies so that their height dimension H extends horizontally.

At the ends of paths 1, their bottoms are defined by a stationary table 5. The walls 3 of each path are provided with respective extensions 6 and 7 which are connected together at their ends by a transverse piece 8 which is shown partially broken away at its bottom in FIG. 3.

The lower edge of extension 6 is at a higher elevation than the lower edge of extension 7 in order not to impede movement of an arm 9 which is fastened to one end of a stationarily mounted pivot shaft 10 and which supports a rod 11 on which, in the illustrated position, shown particularly in FIGS. 3 and 4, a stack of, for example, eight cookies $2_1$ are supported in their upright position, i.e. with their height dimension H vertical. At the other end of pivot shaft 10, there is connected a drive arm 12 whose end is moved back and forth in the directions of the double arrow by conventional control means which are not shown. It can be seen that pivoting of shaft 10 will bring supporting rod 11 into a position 11', shown in FIGS. 3 and 5, in which it no longer supports the stack of cookies $2_1$ so that the same drop, in the region between extensions 6 and 7, onto a discharge path 13 disposed below rod 11 and extending transversely to paths I, the drop being slowed down considerably, however, in a manner to be explained below. As can be seen from FIGS. 1 and 2, extensions 6 and 7 extend across the width of discharge path 13.

The discharge path 13 has a stationary horizontal floor, or bottom, 14 which is fixed to the machine frame and has two vertical guide walls 15 extending along the discharge path and each provided with a longitudinal slot 16 also extending along the discharge path. Carrier rods 17 pass through the longitudinal slots 16 and their ends are fastened to two revolving endless chains 18 disposed at respectively opposite sides of discharge path 13, the upper reaches of the chains 18 being parallel to walls 15. Carrier rods 17 serve to convey the toppled cookies $2_2$ along floor 14 toward the outlet of path 13 from which they are brought, for example, to a packaging machine. On path 13 the articles $2_2$ are conveyed in a direction which lies in the plane of their outline, i.e. the plane defined by dimensions H and W.

In order to bring a stack of eight cookies $2_1$ onto a supporting rod 11, with the rod in the position shown in FIG. 4, the cookies at the outlet end of an associated path 1 are initially pushed forward by the cookies 2 which are located therebehind on path 1 and are being carried along by conveyor belt 4. Thereafter, however, the stack continues moving under the effect of its own inertia until it abuts at transverse piece 8. In this last phase of movement, two inwardly moved clamping jaws 19 which can be seen in FIGS. 1 and 2, retain the foremost cookies $2_3$ in path 1, and thus all other cookies 2 therebehind, so that a gap 20 is created between cookies $2_1$ and $2_3$.

It shall now be explained, with reference to FIG. 4–7, how the cookies $2_1$ reach floor 14 and are toppled in the process. In order to prevent the cookies $2_1$ from falling freely when supporting rod 11 is pivoted from its supporting position shown in FIG. 4 to its release position 11' shown in FIG. 5, there is provided a pickup, or supporting, plate 21 on whose upper edge 22 the cookies $2_1$ are supported after supporting rod 11 has been pivoted away. The pickup plate 21, which passes through a transverse slit 23 in bottom 14, is then lowered so that the cookies successively take on the positions $2_1'$, $2_1''$ shown in FIG. 5 and $2_1'''$ shown in FIG. 6. The edge 22 is slightly downstream of the center of gravity of cookies $2_1$, with respect to the conveying direction of path 13.

In order to topple the cookies, a toppling rod 24 is provided above carrier rods 17, rod 24 extending transversely to bottom 14 and being mounted for forward and backward movement in the directions of the arrows in FIGS. 4, 6 and 7. In its starting position shown in FIGS. 4 and 5, the toppling rod 24 does not prevent lowering of the cookies. When the cookies have reached position $2_1'''$ shown in FIG. 6, i.e. the upper edge 22 of the pickup plate 21 protrudes but slightly above slit 23, toppling rod 24 is moved forward at a speed which significantly exceeds the speed of carrier rods 17, initially causing the cookies to be tilted about the upper edge 22 until their lower frontal corners 25 reach floor 14. This is the position $2_1''''$ shown in FIG. 6. Since the center of gravity of the cookies is then ahead of frontal corners 25, the cookies will topple over, without further aid from toppling rod 24, about the frontal corners 25 into the position $2_2$ of FIG. 7. The narrow sides of cookies $2_2$ are then engaged by a carrier rod 17 while toppling rod 24 returns to its starting position. Supporting rod 11 had already returned to its supporting position earlier to receive a new stack of cookies $2_1$.

Since two channels 1 are provided and thus two lowering and toppling mechanisms 9–12, 21–24, each mechanism in its entirety being designated 26, it is advisable to move both their pickup plates 21 up and down together. For this reason, these plates 21 are fastened by arms 27 to a carrier 28 which extends transversely to discharge path 13 and which can be moved up and down, as indicated by arrows in FIGS. 1 and 3. Likewise, the two toppling rods 24 of mechanisms 26 are fastened to a common support 29 which is moved back and forth in the longitudinal direction of discharge path 13, as indicated by a double arrow in FIG. 3. Carriers 28 and 29 are not shown in FIG. 2 for reasons of clarity. Likewise, the guides and drive means for the carriers are not shown since they are constructed in conventional manners well known in the art.

The supporting rods 11 of the two mechanisms 26 are also coupled together and are actuated, in dependence on the mutual spacing between carrier rods 17 and the speed of chains 18, at such intervals that each stack of cookies $2_2$ comes to lie in front of a different respective carrier rod 17. It should also be mentioned that each supporting rod 11, when in its release position 11', is disposed underneath extension 6 in such a way that it prevents backward toppling of the cookies in position $2_1''$. The same also applies for toppling rod 24 in its starting position when the cookies have been lowered even further to position $2'''$.

The above-described apparatus is very advantageous for fragile cookies since the lowering and toppling mechanisms 26 operate very gently. Even if a high output rate is required, it is not necessary to increase the operating speed of these mechanisms, which can be designed, for example, to each lower and topple 15 stacks per minute. Instead the number of input channels 1 with their associated mechanisms 26 can be increased, e.g. to ten, if the packaging machine being supplied with the cookies is to produce 150 packages per minute. The ratio H/W of objects 1 may be greater than is permitted by the known devices in which a large ratio of H/W would present the danger that the objects may inadvertently topple over at the wrong location. This danger, which also exists if the rectangular outline of the objects includes significantly rounded corners or a somewhat curved short side, is avoided by the apparatus according to the invention.

It will be understood that the above description of the present invention is susceptible to various modifications, changes and adaptations, and the same are intended to be comprehended within the meaning and range of equivalents of the appended claims.

What is claimed is:

1. In a device for toppling articles having two opposed long sides and two opposed short sides while conveying such articles, which device includes means defining a discharge path provided with carrier elements extending perpendicular to both the long sides and the short sides of the article for moving the articles after toppling in a discharge direction extending perpendicular to both the long sides and the short sides of the articles, the improvement comprising means defining at least two input paths above said discharge path for conveying such articles in an input direction transverse to the discharge direction, with the long and short sides of each article perpendicular to the input direction and the long sides of each article vertical; and a plurality of lowering and toppling mechanisms, each associated with a respective input path and disposed for transferring articles from its associated input path to said discharge path while lowering and toppling the articles, each said mechanism including a supporting element movable between a position for supporting articles received from the associated input path and a release position for permitting such articles to drop, a pickup element for supporting and lowering such articles when said supporting element is moved to its release position, and a toppling element movable from a starting position for toppling such articles onto said discharge path upon lowering of such articles by said pickup element, so that the short sides of each such article are vertical on said discharge path; said supporting element being a supporting rod mounted for pivotal movement into the release position, said pickup element being a pickup plate presenting an upper edge on which the articles are supported during lowering, and said toppling element being a toppling rod which extends transversely to said discharge path and arranged for moving articles which have been lowered almost down to said discharge path at a speed which exceeds the speed of said carrier elements until the articles topple over in the discharge direction.

2. An arrangement as defined in claim 1 wherein the articles which have been supplied to said discharge path from different ones of said input paths are conveyed along said discharge path by different respective carrier elements.

3. An arrangement as defined in claim 1 wherein said supporting rod when in its release position and said toppling rod when in its starting position prevent backward toppling of the articles during lowering by said pickup element.

4. An arrangement as defined in claim 1 further comprising means coupling together identical elements of each of said mechanisms for common actuation.

* * * * *